US 11,325,148 B2

(12) United States Patent
Plantard et al.

(10) Patent No.: US 11,325,148 B2
(45) Date of Patent: May 10, 2022

(54) ROD AND LIQUID PAINT SUCTION ASSEMBLY AND METHOD OF MANUFACTURING SUCH A ROD

(71) Applicant: EXEL INDUSTRIES, Epemay (FR)

(72) Inventors: Nicolas Plantard, Paris (FR); Benoît Batllo, Paris (FR); François Morales, Paris (FR)

(73) Assignee: EXEL INDUSTRIES, Epernay (FR)

( * ) Notice: Subject to any disclaimer, the term of this patent is extended or adjusted under 35 U.S.C. 154(b) by 134 days.

(21) Appl. No.: 16/831,687

(22) Filed: Mar. 26, 2020

(65) Prior Publication Data
US 2020/0306782 A1 Oct. 1, 2020

(30) Foreign Application Priority Data

Mar. 28, 2019 (FR) ...................................... 1903245

(51) Int. Cl.
| | |
|---|---|
| *B05B 15/30* | (2018.01) |
| *B05B 9/04* | (2006.01) |
| *B05B 15/40* | (2018.01) |
| *F16L 43/00* | (2006.01) |

(52) U.S. Cl.
CPC ............ *B05B 15/30* (2018.02); *B05B 9/0403* (2013.01); *B05B 15/40* (2018.02); *F16L 43/001* (2013.01)

(58) Field of Classification Search
CPC ....... B05B 15/30; B05B 9/0403; B05B 15/40; B05B 9/0409; B05B 13/005; B05B 15/00; F16L 43/001; F16L 43/00; F16L 11/04; F16L 9/02; F16L 37/08; E04F 21/08; E04F 21/12

USPC ......................................................... 222/382
See application file for complete search history.

(56) References Cited

U.S. PATENT DOCUMENTS

| | | | |
|---|---|---|---|
| 4,998,993 | A | 3/1991 | Kenderi et al. |
| 8,651,397 | B2 | 2/2014 | Gaddis et al. |
| 2013/0277455 | A1 | 10/2013 | Thompson et al. |
| 2014/0312142 | A1 | 10/2014 | Lovett |

FOREIGN PATENT DOCUMENTS

| | | |
|---|---|---|
| EP | 1647631 A1 | 4/2006 |
| FR | 1599173 | 8/1970 |
| FR | 2537696 A1 | 11/1983 |

OTHER PUBLICATIONS

INPI Rapport de Recherche Preliminaire for Patent Application No. FR 1903245, Jan. 17, 2020, 2 pp.
EPO Rapport de Recherche Europeenne for Patent Application No. EP 20166116, Jul. 23, 2020, 2 pp.

*Primary Examiner* — Vishal Pancholi
(74) *Attorney, Agent, or Firm* — Soquel Group, LLC

(57) ABSTRACT

A liquid paint suction rod including an upstream tube, a flexible intermediate tube and a rigid downstream tube, which includes a downstream elbow, the downstream tube delimiting a series of passage sections defining centers constituting a trajectory, the downstream elbow extending along a curved part of the trajectory, along which the passage sections are substantially discoid and have a preferably constant diameter; in order to avoid imposing too great a curve on the intermediate tube while offering a reduced head loss for the paint passing through the rod and while being easy to manufacture, the curved part is in the shape of a planar arc of circle, having a curve radius, the ratio of the diameter to the curve radius being less than 1.

13 Claims, 4 Drawing Sheets

ROD AND LIQUID PAINT SUCTION ASSEMBLY AND METHOD OF MANUFACTURING SUCH A ROD

CROSS-REFERENCE TO RELATED APPLICATION

This application claims priority of French Patent Application No. 19 03245, filed on Mar. 28, 2019.

FIELD OF THE INVENTION

The invention relates to the field of liquid paint sprayers, specifically to a liquid paint suction rod, a liquid paint suction assembly including such a rod and a method for manufacturing such a rod.

BACKGROUND OF THE INVENTION

A known liquid paint sprayer comprises a spray gun supplied with liquid paint by a pneumatic pump. To that end, a flexible tube of sufficient length is generally provided, for example several meters or several tens of meters, for the operator to be able to manipulate the paint gun with ease, so that the pump remains stationary, while being mounted on a trolley or a support permanently fastened on the ground, such as a wall or a beam. The pump draws liquid paint in a paint bucket or a liquid paint tank using a suction rod. The suction rod is fluidly connected to the pump, upstream from said pump, and has a free end that soaks in the paint bucket in order to suction said paint under the action of the pump. More specifically, the pump includes a suction inlet facing downward, on which a standard rectilinear metal coupler is mounted. A flexible intermediate tube belonging to the suction rod is connected to this metal coupler. At the other end of the flexible tube, the suction rod includes a bent metal tube partially submerged in the liquid paint bucket.

However, the vertical orientation of the standard coupler is still not satisfactory in light of the height of the pump, which can lead to imparting strong bending of the flexible intermediate tube. In place of the standard rectilinear coupler, it is possible to provide an L-shaped bent standard coupler. However, the implementation of such an L-shaped bent coupler causes a substantial head loss that is very detrimental to the pumping of the paint and can therefore require providing a higher powered pump.

SUMMARY OF THE DESCRIPTION

One of the aims of embodiments of the invention is therefore to address these drawbacks by proposing a new suction rod that avoids imposing too great a curvature on the intermediate tube while offering a reduced head loss for the paint passing through the suction rod, while being easy to manufacture.

The invention relates to a liquid paint suction rod, designed to be connected to a liquid paint suction pump and including:
- a rigid upstream tube, which includes a suction end and an upstream elbow, the suction end being designed to be submerged in liquid paint in order to suction liquid paint through the rod;
- a flexible intermediate tube; and
- a rigid downstream tube, which includes:
  - a connecting end, designed to be fluidly connected to the pump,
  - a receiving end, the intermediate tube fluidly connecting the upstream tube to the receiving end, and
  - a downstream elbow, between the receiving end and the connecting end, wherein the downstream tube delimits a series of transverse passage sections for the liquid paint, from the receiving end to the connecting end, each passage section defining a passage section center, the union of the passage section centers constituting a trajectory of the downstream tube, the downstream elbow extending along a curved part of the trajectory, along which the passage sections have a substantially discoid shape and have a preferably constant diameter.

According to the invention, the curved part of the trajectory is in the shape of a planar arc of circle, having a curve radius, the ratio of the diameter to the curve radius being less than 1.

One idea at the base of the invention is to provide that the downstream tube guides a circulation in a gradual curve of the liquid paint from the receiving end to the connecting end, in order to avoid generating an excessive head loss. Indeed, the gradual curve of the trajectory of the downstream tube promotes a good circulation of the liquid paint, which generally has mediocre flow properties, for example including a relatively high viscosity. The expression "trajectory" designates a geometric curve of the downstream tube, sometimes designated by the expression "neutral fiber". Owing to the curve of the downstream tube, the part of the trajectory at the receiving end advantageously has a horizontal orientation, or at least inclined relative to the vertical, which prevents an excessive bending of the flexible intermediate tube that is connected thereto. Furthermore, the downstream tube is easy to manufacture, since it can advantageously be obtained using a manufacturing method similar to that of the upstream tube, for example including bending of a raw rectilinear tube in order to obtain the downstream elbow and the upstream elbow, respectively.

Other optional and advantageous features of embodiments of the invention, considered according to all technically allowable combinations, are defined below:
- The ratio of the diameter to the curve radius is between 0.55 and 0.70, and is preferably equal to 0.625.
- The diameter is between 20 mm and 30 mm, and is preferably equal to 25 mm; and the curve radius is between 31 mm and 50 mm, and is preferably equal to 40 mm.
- The curved part of the trajectory defines a center angle with a value of between 85° and 95°, the value of the center angle preferably being equal to 90° such that the passage section of the receiving end is perpendicular to the passage section of the connecting end.
- The rod further includes a connecting nut to securely attach the downstream tube to the pump, the connecting nut being mounted at the connecting end, freely pivoting relative to the downstream tube around the trajectory, the connecting nut including at least one lug by means of which the tightening of the connecting nut can be done.
- The rod includes an outer radial shoulder formed at the connecting end and forming a conical surface designed to be able to be received by bearing against a complementary connecting seat belonging to the pump, when the rod is connected to the pump, the conical surface being centered on the trajectory and converging along the trajectory in a downstream direction oriented away from the receiving end.
- The upstream tube and the downstream tube are made from metal, preferably stainless steel, and the intermediate tube from a flexible material, preferably elastomer.
- The rod further includes a liquid paint filtering strainer, borne by the suction end.

Embodiments of the invention also relate to a liquid paint suction assembly for a liquid paint sprayer, the suction assembly including a rod, according to the preceding, and a pump, the pump being fluidly connected to the connecting end of the rod so as to be able to suction liquid paint by means of the rod.

Embodiments of the invention also relate to a method for manufacturing a rod according to the preceding, or a suction assembly according to the preceding, the method including:
- providing or manufacturing the upstream tube;
- providing or manufacturing the intermediate tube;
- manufacturing the downstream tube from a raw rectilinear tube, the manufacturing of the downstream tube including bending the raw rectilinear tube in order to form the downstream elbow of the downstream tube with the curve radius, such that the ratio of the diameter to the curve radius is less than 1; and
- assembling the upstream tube, the intermediate tube and the downstream tube.

BRIEF DESCRIPTION OF THE DRAWINGS

The following disclosure relates to exemplary embodiments of the invention, provided non-limitingly, and is done in reference to the appended drawings, in which.

DETAILED DESCRIPTION

Figure 1:
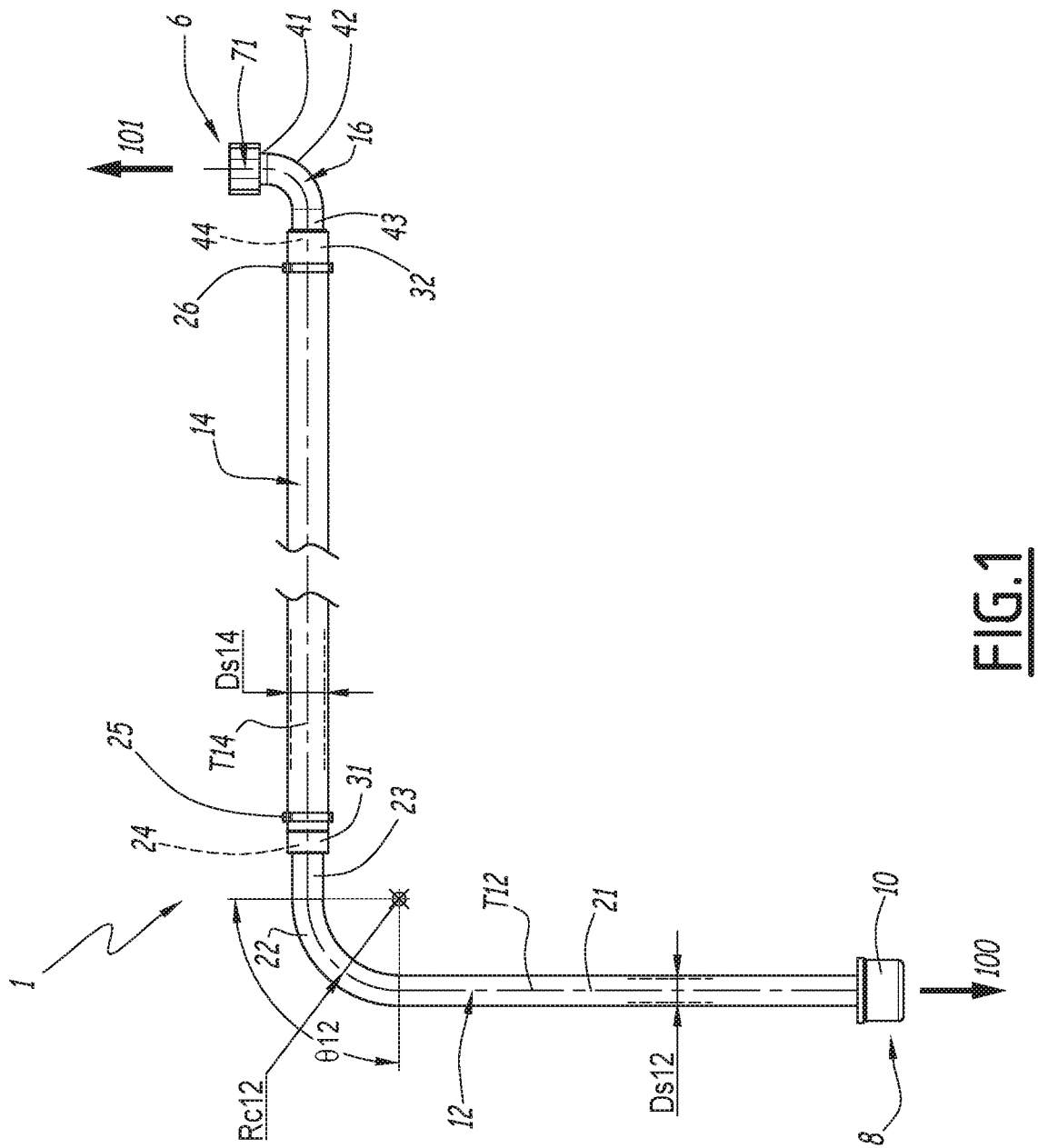
FIG. 1 is a partial side view, to scale, of a suction rod according to one embodiment according to the invention.
Figure 2:
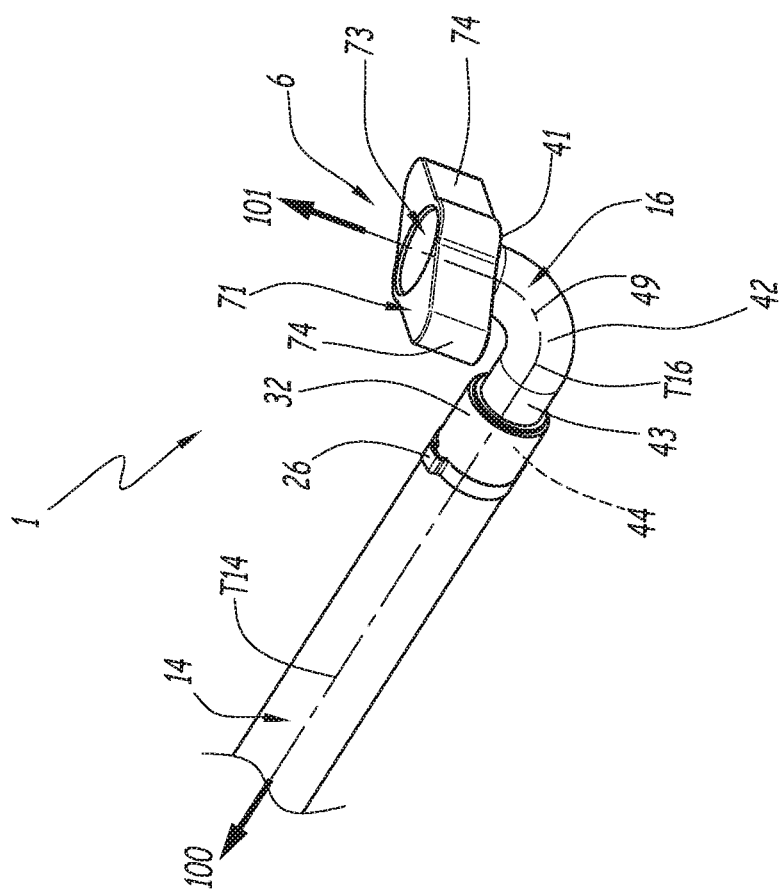
FIG. 2 is a partial perspective view of the suction cam of FIG. 1, to scale.
Figure 3:
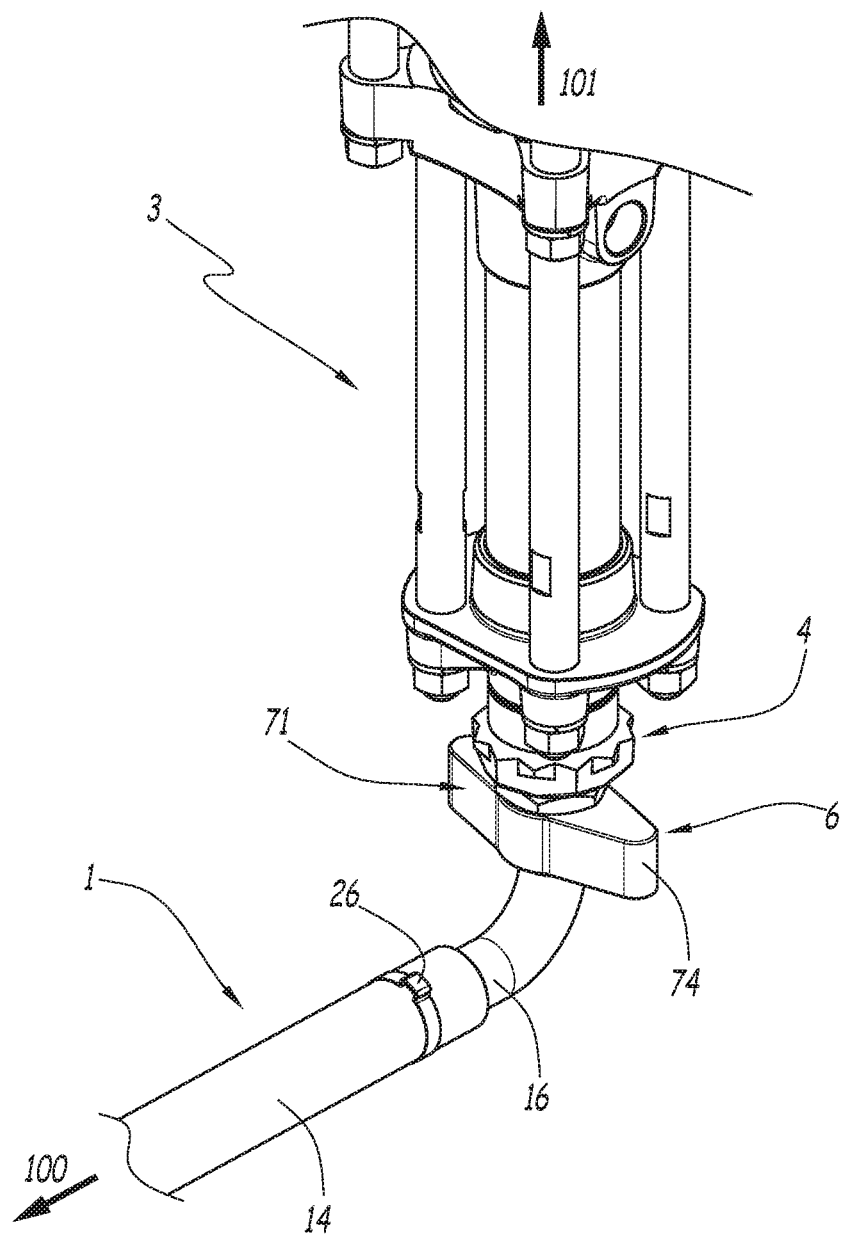
FIG. 3 is a partial perspective view of a liquid paint suction assembly, to scale, comprising the suction rod of FIG. 1 and according to the invention.
Figure 4:
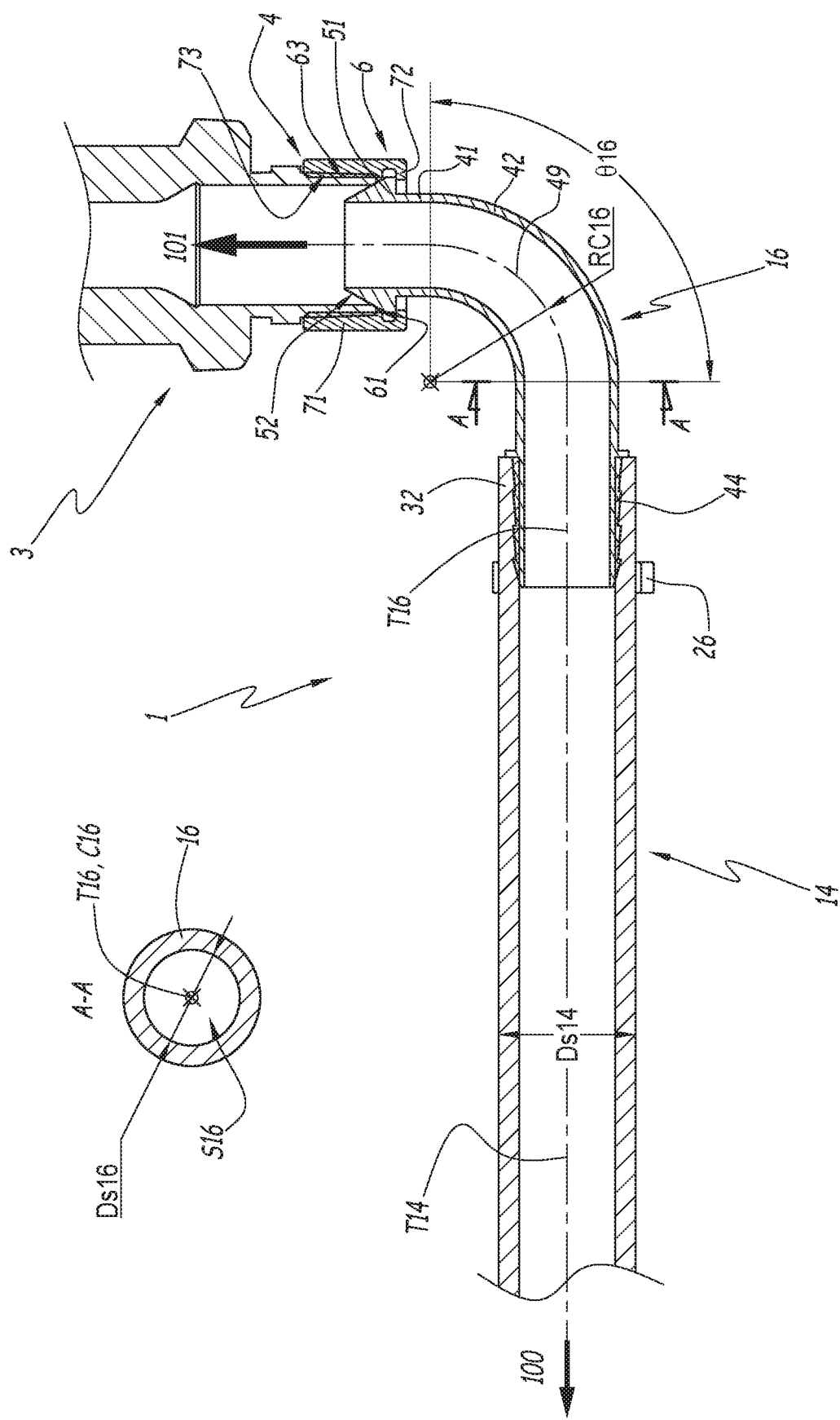
FIG. 4 is a partial longitudinal sectional view, to scale, of the suction assembly of FIG. 3.

FIGS. 1 and 4 show a liquid paint suction assembly, including a rod 1 and a suction pump 3, the latter being partially shown in FIGS. 3 and 4. The suction assembly constitutes part of a liquid paint sprayer, further including a paint gun, not shown, supplied by suction pump 3. Pump 3 is preferably actuated by a pneumatic motor, not shown, for example to that end supplying compressed air, at a pressure, for example, of between 1 and 6 bars, to pump 3. Pump 3 in turn advantageously delivers a pressure of between 100 and 450 bars, owing to the supply of compressed air provided by the motor. In a variant, depending on the application, it is possible to provide that pump 3 delivers a pressure of less than 100 bars, or less than 20 bars.

The paint gun is fluidly connected at the outlet of pump 3, that is to say, downstream from the pump, by means of a flexible tube with a length that, depending on the application, may be between 10 m and 50 m (meters). Pump 3 thus discharges the liquid pump in order to supply the gun, by means of the flexible tube.

The paint sprayer may be used for various applications, for example, worksite applications such as the application of paint to a naval vehicle, the application of an outer coating to a building, or the paint of a ceiling. In this case, the suction assembly is advantageously mounted on a trolley, or any other moving support. Alternatively, the paint sprayer may be used in the plant. In this case, the suction assembly may be mounted on a trolley, any other moving support, or on a stationary support such as a wall or a beam.

Rod 1 includes a connecting end 6, which is fluidly connected to an inlet end 4 of pump 3, that is to say, rod 1 is mounted upstream from pump 3.

Rod 1 includes a suction end 8, opposite connecting end 6, by means of which rod 1 suctions liquid paint coming from a liquid paint reserve, such as a bucket or a tank. As a function of the application, it is possible to provide that the liquid paint reserve is a bucket, for example, a bucket of 20 L (liters) of paint, or a tank, for example, a tank of 100 L of paint.

Suction end 8 is submerged in the liquid paint of the 3 reserve so that the paint can be suctioned via rod 1 under the action of pump. The paint circulates from suction end 8 to connecting end 6, where the paint reaches pump 3. Preferably, rod 1 includes a liquid paint filtering strainer or screen 10, which is borne by suction end 8. Strainer 10 thus performs coarse filtering of the liquid paint before it is allowed into rod 1, which avoids excessive dirtying of rod 1.

For the present invention, the upstream direction 100 and the downstream direction 101 are defined relative to the circulation direction of the liquid paint during the working operation of the suction assembly, that is to say, when the gun sprays paint discharged by pump 3 and suctioned via rod 1. Then in particular, end 8 is in the upstream direction 100 relative to end 6, and end 6 is in the downstream direction 101 relative to end 8.

Suction rod 1 includes an upstream tube 12, an intermediate tube 14 and a downstream tube 16, successively fluidly connected in that order from upstream 100 to downstream 101, so as to form a continuous duct for the paint, from end 8 to end 6. End 8 is formed by the free upstream end of upstream tube 12. End 6 is formed by the free downstream end of downstream tube 16.

Upstream tube 12 and downstream tube 16 are rigid, that is to say, they are more rigid than intermediate tube 14, which is, on the contrary, flexible. To that end, for example, upstream tube 12 and downstream tube 16 are made from metal, for example stainless steel, which is not designed to be deformed by hand by the user. On the contrary, in order to be flexible, intermediate tube 14 is made from a flexible material, in particular elastomer, for example rubber, this flexible material being designed to be bent reversibly during use, like a garden watering hose. Rod 1 preferably includes a flexible electric conductor, for example, an electric wire, electrically coupling tubes 12 and 16, which makes it possible to avoid any risk related to any flammability of the liquid paint.

In the figures, tube 14 is shown cut for simplification reasons, since tube 14 preferably has a length of between 1 m and 2 m.

From end 8, upstream tube 12 successively includes a part 21, preferably rectilinear, an elbow 22, referred to as "upstream elbow", a part 23, preferably rectilinear and perpendicular to part 21, and a downstream end 24, referred to as "transmission end", which is fitted, sealed against the paint, in an upstream end 31 of tube 14. The fitting is advantageously maintained by an external gripping ring 25. Upstream tube 12 is therefore fluidly connected to intermediate tube 14, via their respective ends 24 and 31. During use, part 21 is preferably oriented vertically, or is slightly inclined relative to the vertical, when end 8 is submerged in the liquid paint, while part 23 is oriented horizontally, or slightly inclined relative to the horizontal. Rod 1 may then advantageously rest on the edge of the bucket or the paint tank by means of part 23, while part 21 is submerged toward the bottom of the bucket or the tank, such that end 8 is close to or against the bottom. Elbow 22 advantageously has an arc of circle shape, the curve radius of which is high enough to minimize the head loss related to the circulation of the paint in rod 1.

Upstream tube 12 preferably has an annular cross-section over its entire length. Upstream tube 12, in particular the inner wall thereof guiding the liquid paint, thus delimits a series of substantially discoid transverse passage sections of constant diameter Ds12, for the liquid paint, from end 8 to end 24. Each passage section of tube 12 defines a passage section center, which is the center of the discoid shape of the passage section in question. The union of the passage section centers constitutes a trajectory T12 of tube 12, shown in mixed lines in FIG. 1. Parts 21 and 23 of tube 12 extend along respective rectilinear parts of trajectory T12. Elbow 22 extends along a curved part of trajectory T12. Trajectory T12 is advantageously plainer, in the plane of FIG. 1. The diameter Ds12 is sometimes referred to as "inner diameter" of tube 12. For upstream tube 12, the curved part of trajectory T12 is advantageously in the shape of a planar arc of circle, in the plane of FIG. 1 and having a curve radius Rc12, the ratio of the diameter Ds12 to the curve radius Rc12 being less than 1, or even less than 0.5. The head loss is therefore minimized during the circulation of the liquid paint in tube 12.

Preferably, the curved part of trajectory T12 defines a center angle θ12 of 90°, or otherwise a value advantageously between 85° and 95°. When the value of center angle 812 is equal to 90°, the passage section formed by end 8 is perpendicular to the passage section formed by end 24. In other words, the two rectilinear parts of trajectory T12 are perpendicular.

Preferably, intermediate tube 14 has an annular cross-section over its entire length. Tube 14 thus delimits a series of substantially discoid transverse passage sections with diameter Ds14 close to, or equal to, diameter Ds12. Each passage section of tube 14 defines a passage section center, which is the center of the discoid shape of the passage section in question. The union of the passage section centers constitutes a trajectory T14 of tube 14, shown in mixed lines in FIG. 1. Tubes 12 and 14 are advantageously molded and assembled such that trajectory T14 extends trajectory T12. The diameter Ds14 is sometimes referred to as "inner diameter" of tube 14.

From end 6, downstream tube 16 successively includes a part 41, preferably rectilinear, an elbow 42, referred to as "downstream elbow", a part 43, preferably rectilinear and perpendicular to part 41, and an upstream end 44, referred to as "reception end", which is fitted, sealed against the paint, in a downstream end 32 of tube 14. The fitting is advantageously maintained by an external gripping ring 26. Downstream tube 16 is therefore fluidly connected to intermediate tube 14, via their respective ends 44 and 32. During use, part 41 is preferably oriented vertically, or is slightly inclined relative to the vertical, when end 6 is connected to pump 3, while part 43 is oriented horizontally, or slightly inclined relative to the horizontal. Tube 14 is then oriented horizontally in the vicinity of its end 32, which prevents it from imparting too great a bend if the height of the available space below the pump is small, or if the edge of the paint bucket or tank is particularly high relative to the bottom of pump 3.

Preferably, as shown in FIG. 4 for end 44, each tube 12 and 16 includes, at its respective end 24 or 44, outer radial ribs to improve the reliability of the fittings with tube 14. Preferably, as shown in FIG. 4 for end 44, each tube 12 and 16 includes, at its respective end 24 or 44, an outer shoulder against which end 31 or 32 in question bears axially, which makes it possible to ensure precise axial positioning of tube 14 on each tube 12 and 16 when fitted.

Elbow 42 advantageously has an arc of circle shape, the curve radius of which is high enough to minimize the head loss related to the circulation of the paint in rod 1.

Downstream tube 16 preferably has an annular cross-section over its entire length. Downstream tube 16, in particular the inner wall thereof guiding the liquid paint, thus delimits a series of substantially discoid transverse passage sections S16 for the liquid paint, from end 44 to end 6. Each passage section of tube 16 defines a passage section center C16, which is the center of the discoid shape of the passage section in question. The union of the passage section centers constitutes a trajectory T16 of tube 16, shown in mixed lines in particular in FIG. 4. As shown in FIG. 4, parts 41 and 43 of tube 16 extend along respective rectilinear parts of trajectory T16. Elbow 42 extends along a curved part 49 of trajectory T16. At least for part 49, and preferably also for the entire length of trajectory T16, sections S16 are substantially discoid and of constant diameter Ds16. Trajectory T16 is advantageously plainer, in the plane of FIG. 4. Diameter Ds16 is sometimes referred to as "inner diameter" of tube 16.

A cross-sectional view A-A of tube 16 is shown in FIG. 4, in order to identify one of passage sections S16, diameter Ds16, and center C16 of this passage section S16.

For the present description, "substantially discoid" means that the passage section in question may either be exactly discoid or have a slightly flattened discoid shape, of the elliptical type, or slightly deformed, for example ovoid. The passage section may in particular not be strictly discoid if it is located on curved part 49 of trajectory T16. In this case, diameter Ds16 refers to the largest diameter of the passage section.

For downstream tube 16, curved part 49 of trajectory T16 is advantageously in the shape of a planar arc of circle, in the plane of FIG. 4 and having a curve radius Rc16. In the present example, the ratio of diameter Ds16 to curve radius Rc16 is equal to 0.625, diameter Ds16 being equal to 25 mm (millimeters) and curve radius Rc16 being equal to 40 mm. Preferably, it is provided that diameter Ds16 is between 20 and 30 mm, while curve radius Rc16 is between 31 and 50 mm. Preferably, it is provided that the ratio of diameter Ds16 to curve radius Rc16 is between 0.55 and 0.70. More generally, it is provided at least that the ratio of diameter Ds16 to curve radius Rc16 is less than 1, that is to say that (Ds16/Rc16)<1. The head loss is therefore minimized during the circulation of the liquid paint in tube 16, as explained above.

Preferably, curved part 49 of trajectory T16 defines a center angle 816 of 90°, or otherwise a value advantageously between 85° and 95°. When the value of center angle 816 is equal to 90°, passage section S16 formed by end 44 is perpendicular to passage section S16 formed by end 6. In other words, the two rectilinear parts of trajectory T16 are then perpendicular.

Tubes 14 and 16 are advantageously molded and assembled such that trajectory T16 extends trajectory T14.

Preferably, diameters Ds12 and Ds16 are equal to one another, and are preferably equal, at least approximately, to diameter Ds14. Preferably, tubes 12 and 16 are manufactured from a same raw tube, taken and worked in order to form tubes 12 and 16.

Preferably, as shown in FIG. 4, suction rod 1 includes an outer radial shoulder 51 formed at end 6. Outer radial shoulder 51 bears a conical surface 52. Conical surface 52 is centered and coaxial with the rectilinear part of trajectory T16 located at the height of end 6. Conical surface 52 converges along trajectory T16 in the downstream direction, that is to say here, toward pump 3. When suction rod 1 is connected to suction pump 3, as is the case in FIG. 4, conical surface 52 is designed to be received by bearing against a connection seat 61 of pump 3, which is complementary with conical surface 52. Preferably, at end 4, seat 61 has a tubular shape, with an annular section, with a diameter larger than that of tube 16. Thus, conical surface 52 bears against annular seat 61, so as to center tube 16 automatically on inlet end 4 of pump 3. Contact of conical surface 52 against seat 61 is done over the entire circumference of conical surface 52, such that sealing against the liquid paint is provided for this connection, by axial gripping of conical surface 52 against seat 61.

Preferably, connection seat 61 is beveled on the inside so as to have a conical shape complementary with conical surface 52.

In order to ensure this axial gripping and thus to fluidly connect tube 16 to pump 3, such that tube 16 is further stationary relative to end 4 of pump 3, rod 1 advantageously includes a connecting nut 71.

Connecting nut 71 is mounted at end 6 of tube 16, while freely pivoting relative to tube 16, around the rectilinear part of trajectory T16. The nut 71 includes an inner shoulder 72 that abuts axially against shoulder 51, such that the nut cannot be removed from tube 16 if nut 71 is pulled in the downstream direction. Furthermore, nut 71 is able to apply a gripping force in the downstream direction, by bearing axially against shoulder 51 via its shoulder 72. Nut 71 includes an inner thread 73, extending downstream from shoulder 72. Nut 71 thus has a general skirt shape which, in FIG. 4, faces upward. End 4 bears, in the downstream direction from seat 61, an outer thread 63 complementary to inner thread 73. Thus, nut 71 may be screwed on end 4 by screwing thread 73 with thread 63, this screwing causing a placement in contact and an axial gripping of conical surface 52 against seat 61.

Particularly advantageously, nut 71 includes two lugs 74, which each form an outer radial protrusion. These lugs are distributed evenly over the circumference of nut 71. Lugs 74 make it possible to tighten and loosen nut 71 without tools. Indeed, the operator using the liquid paint sprayer is not necessarily equipped with such tools, whereas he may need to remove rod 1 from pump 3 in order to perform cleaning, change rods, performing unclogging or change colors. In particular, if nut 71 is tightened and accidentally clogged by paint, it is possible to loosen the nut by striking a mallet on lugs 74, whereas this loosening would have been much more difficult if the nut had been a six-sided nut.

In a variant, nut 71 includes a number of lugs 74 different from two.

Nut 71 may, for example, include a single lug 74 while having the advantages developed above, namely making it possible to perform the tightening and loosening of nut 71 without tools. In particular, if nut 71 is tightened and accidentally clogged by paint, it is possible to loosen the nut by striking a mallet on lug 74, whereas this loosening would have been much more difficult with another nut.

Suction rod 1 and the suction assembly defined above are preferably manufactured using a manufacturing method defined below.

In this manufacturing method, manufacturing operations of the upstream tube 12 and the downstream tube 16 are carried out.

In order to manufacture these two tubes 12 and 16, one advantageously starts with a same raw rectilinear tube, or two identical respective raw tubes, the passage section diameter of which is equal to the diameters Ds12 and Ds16, which in turn are equal to one another. For each of tubes 12 and 16, upstream elbow 22 and downstream elbow 42 are made by bending the rectilinear tube, in order to impart a curve radius Rc12 or Rc16, as a function of tube 12 or 16 in question, the curve radius Rc12 or Rc16 being large enough relative to the passage section diameter, or Ds12 or Ds16, in order to verify that (Ds12/Rc12)<1 and (Ds16/Rc16)<1.

It is therefore particularly easy to manufacture rod 1, since tubes 12 and 16 may be obtained with a similar bending process, preferably from same raw profiles.

In a variant, upstream tube 12 may be supplied rather than manufactured. In a variant, upstream tube 12 is manufactured from a different raw part from that used to manufacture tube 16. In a variant, intermediate tube 14 may be manufactured rather than supplied.

The manufacturing method also includes an operation for adding strainer 10 to tube 12. The manufacturing method also includes an operation for forming or adding shoulder 51 on tube 16.

Once tubes 12, 14 and 16 are obtained, the method includes an operation for assembling tubes 12, 14 and 16 together, preferably by fitting, as explained in the preceding.

Any feature disclosed in the preceding for one embodiment or variant, can be implemented in the other embodiments and variants disclosed in the preceding, as long as it is technically possible to do so.

The invention claimed is:

1. A liquid paint suction rod connected to a liquid paint suction pump, the rod comprising:
   a rigid upstream tube, comprising:
      a suction end submerged in liquid paint in order to suction liquid paint through the rod; and
      an upstream elbow;
   a flexible intermediate tube; and
   a rigid downstream tube delimiting a series of transverse passage sections for the liquid paint, from a receiving end to a connecting end, each passage section defining a passage section center, the union of the passage section centers constituting a trajectory of the downstream tube, the downstream tube comprising:
      said connecting end, fluidly connected to the pump;
      said receiving end, wherein said intermediate tube fluidly connects said upstream tube to the receiving end; and
      a downstream elbow, between said receiving end and said connecting end, extending along a curved part of the trajectory in the shape of a planar arc of circle having a curve radius, along which the passage sections have a substantially discoid shape and have a diameter, the ratio of the diameter to the curve radius being less than 1.

2. The rod according to claim 1, wherein the diameter of the passage sections is constant.

3. The rod according to claim 1, wherein the ratio of the diameter to the curve radius is between 0.55 and 0.70.

4. The rod according to claim 1, wherein the diameter is between 20 mm and 30 mm, and the curve radius is between 31 mm and 50 mm.

5. The rod according to claim 1, wherein the curved part of the trajectory defines a center angle between 85° and 95°.

6. The rod according to claim 5, wherein the center angle is equal to 90°, such that the passage section of said receiving end is perpendicular to the passage section of said connecting end.

7. The rod according to claim 1, further comprising a connecting nut to securely attach said downstream tube to the pump, the connecting nut being mounted at said connecting end, freely pivoting relative to said downstream tube around the trajectory, the connecting nut comprising at least one lug tightening said connecting nut.

8. The rod according to claim 1, further comprising an outer radial shoulder formed at said connecting end and forming a conical surface received by bearing against a complementary connecting seat belonging to the pump, the conical surface being centered on the trajectory and converging along the trajectory in a downstream direction oriented away from said receiving end.

9. The rod according to claim 1, wherein said upstream tube and said downstream tube are comprised of a metal, and said intermediate tube is comprised of a flexible material.

10. The rod according to claim 9, wherein said upstream tube and said downstream tube are comprised of stainless steel, and said intermediate tube is comprised of an elastomer.

11. The rod according to claim 1, further comprising a liquid paint filtering strainer, borne by the suction end.

12. A liquid paint suction assembly for a liquid paint sprayer, the suction assembly comprising:
a rod according to claim 1; and
a pump fluidly connected to the connecting end of said rod so as to be able to suction liquid paint by means of said rod.

13. A method for manufacturing a rod according to claim 1, the method comprising:
providing or manufacturing the upstream tube;
providing or manufacturing the intermediate tube;
manufacturing the downstream tube from a raw rectilinear tube, comprising bending the raw rectilinear tube in order to form the downstream elbow of the downstream tube with the curve radius, such that the ratio of the diameter to the curve radius is less than 1; and
assembling the upstream tube, the intermediate tube and the downstream tube.

* * * * *